March 8, 1938. A. P. BALL 2,110,120
ADJUSTABLE SHADE FOR AUTOMOBILE BODIES
Filed June 15, 1934
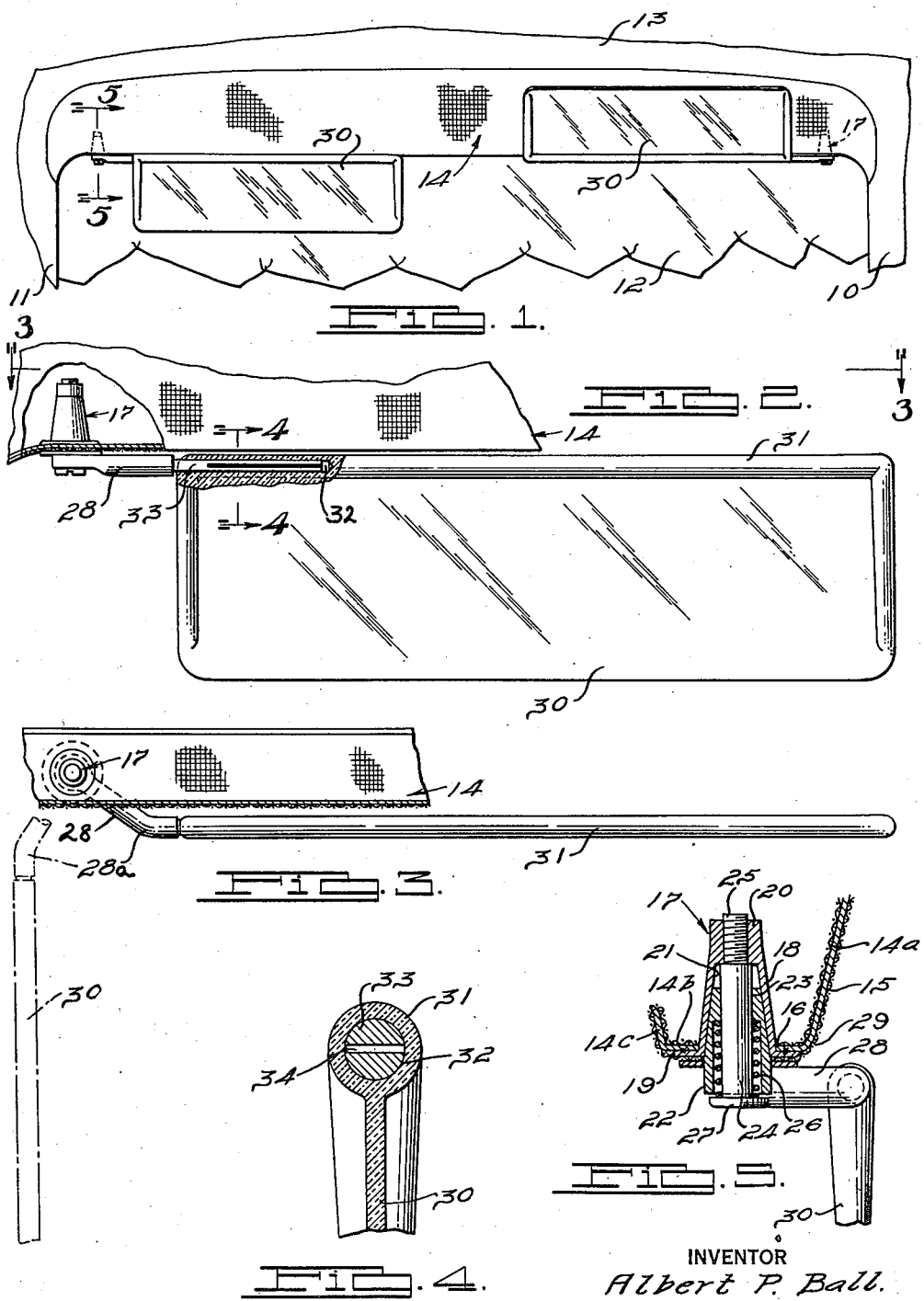
INVENTOR
Albert P. Ball.
BY
Dike, Calver & Gray
ATTORNEYS.

Patented Mar. 8, 1938

2,110,120

UNITED STATES PATENT OFFICE 2,110,120

ADJUSTABLE SHADE FOR AUTOMOBILE BODIES

Albert P. Ball, Detroit, Mich., assignor to Briggs Manufacturing Company, Detroit, Mich., a corporation of Michigan Application June 15, 1934, Serial No. 730,724

4 Claims. (Cl. 296—97)

This invention relates to glare shields or sun visors for vehicles, particularly automobile bodies, and an object of the invention is to provide an improved shield or visor and adjustable means for mounting the same above the windshield of an automobile body whereby adjustment of the device into various desired positions may be readily and easily accomplished.

A further object of the invention is to provide an improved visor or glare shield assembly of relatively simple construction wherein the shield proper is pivotally mounted within the upper margin of the windshield opening for horizontal swinging movement at substantially the eye level of the driver or front seat occupant of the automobile while at the same time being arranged to be turned, when not in use, into an out of the way position flush with the sloping header panel of the windshield.

Other objects of this invention will appear in the following description and appended claims, reference being had to the accompanying drawing forming a part of this specification wherein like reference characters designate corresponding parts in the several views.

Fig. 1 is a fragmentary front elevation of the front end of an automobile body taken from the inside of the body.

Fig. 2 is an enlarged fragmentary view, in elevation, illustrating a portion of the header panel and a shield mounted thereon, parts being shown in section.

Fig. 3 is a fragmentary horizontal section taken substantially through lines 3—3 of Fig. 2 in the direction of the arrows.

Fig. 4 is a detail section taken through lines 4—4 of Fig. 2 in the direction of the arrows.

Fig. 5 is a detail section taken through lines 5—5 of Fig. 1 in the direction of the arrows.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitations, and it is not intended to limit the invention claimed herein beyond the requirements of the prior art.

In the drawing there is illustrated, by way of example, one embodiment of the invention as applied to an automobile body. The body comprises a front end assembly including upright pillars 10 and 11 forming the marginal sides of a windshield opening within which is mounted a windshield glass 12. The forward end of the roof of the body is indicated at 13. The front end assembly also comprises an interior upper transverse header panel 14 which connects the upper ends of the pillars 10 and 11. This header panel is in the form of a metal stamping covered with trim fabric 15 and comprises preferably an inclined vertically extending side or wall 14a terminating at its lower edge in a forwardly extending horizontal flange 14b. The front end of this flange is turned or bent upwardly at 14c and in practice is confined by the forward downwardly curved or sloping portion of the front transverse roof panel which terminates at the upper edge of the windshield. The flange 14b forms the upper transverse reveal of the windshield opening in rear of the windshield glass 12.

In the present instance the reveal flange 14b is perforated to provide a circular hole or aperture 16 through which is inserted a thimble-like bearing member 17 adapted to project into the space within the hollow header of the windshield. The member 17 comprises a tapered body or shank 18 terminating at its lower edge in an out-turned annular flange 19 abutting the lower face of the reveal flange 14b and preferably spot welded thereto. The upper end of the member 18 forms a head 20. The body 18 is hollow and has downwardly tapered inner walls 21 thus forming a tapered socket to receive the correspondingly tapered portion 23 of a plug 22 adapted to rotate within the socket.

The tapered face of the member 23 is wedged within the tapered bore 21 of the socket by means of an adjustable spring plunger comprising an adjusting screw 24 having a reduced threaded upper end 25 adapted to be screwed into a vertically tapped hole in the head 20. A coil spring 26 embraces the lower portion of the screw shank within a counterbore in the part 22 and is confined under compression between the head 27 of the screw and the upper end of the counterbore.

The plug 22 is preferably integral with a laterally and rearwardly extending arm 28 and forms a vertical offset of said arm. In the position shown in Figs. 1 and 5, or in full lines in the remaining figures, the arm 28 terminates at its rear end slightly in rear of the bend or edge 29 in the header panel 14 (see Fig. 5), at which point it is bent transversely at 28a to provide an extended portion parallel with and proximate to the edge 29.

Mounted to turn on the arm 28 is a glare shield or visor 30 which may be formed preferably of suitable transparent composition material capable of filtering out certain rays of the sun. The shield 30 in the present instance has a beaded or rolled edge 31 for reinforcing the same which may be molded from the material of the shield proper or may comprise a tubular metal core about which the material is molded. A hole 32 may be drilled horizontally through the end of the upper rolled edge 31. The extended portion of the arm 28 is in the present instance machined to provide a reduced extension 33 which may be split from its free end rearwardly a suitable distance as at 34. The split extension 33 is forced a suitable distance into the hole 32 with the split ends contracted under tension sufficiently to bind frictionally within the hole without, however, preventing the shield from being forceably turned on the extension 33. The latter thus provides a pivotal support for the shield permitting the latter to be rotated about a horizontal axis.

The header panel 14 forms with the forward edge of the roof a hollow header enclosing and concealing the socket member 17. From the foregoing it, therefore, will be seen that the body is provided with a header panel which extends transversely above the windshield opening and which comprises an upright portion 14a extending downwardly from the roof and having a forwardly extending flange 14b at its lower edge forming the upper margin or reveal of the windshield opening. It will also be seen that the supporting arm 28 is pivotally mounted on the reveal flange 14b so as to swing horizontally about a vertical axis and in a plane below the reveal or lower marginal edge of the windshield header. Moreover, the arm 28 provides a horizontal pivot 33 for frictionally supporting the shield 30 so as to permit the latter to be turned or rotated about a horizontal axis. In Fig. 1 there are shown two shields 30 mounted at opposite ends of the windshield header and it will be observed that the shield may be swung bodily in a horizontal direction as indicated in dotted lines in Fig. 3 or, when not in use, it may be moved into position, as shown at the right in Fig. 1, so as to lie flush or substantially coplanar with the wall 14a.

I claim:

1. In a vehicle body having a windshield opening and a windshield header comprising a panel having a vertical wall extending downwardly from the roof and forwardly flanged at its lower edge to provide the upper horizontal reveal of said opening, an arm having a vertical offset portion journalled in said flanged portion to swing horizontally beneath said reveal, and a glare shield rotatably mounted on said arm to swing into position above the reveal and substantially flush with said wall, the offset portion of said arm being located forwardly of said vertical wall.

2. In a vehicle body having a windshield opening and a hollow header extending transversely above the opening, a conical socket projecting into the header and having a flange around its base secured to the bottom of the header, a hollow conical plug rotatably fitting into and projecting down from the socket and having an interior shoulder facing downward, a shaft extending up through the hollow plug and secured at its upper end to the socket, the shaft having a shoulder facing upward and opposed to the shoulder in the plug, a spring between the shoulders to hold the plug in the socket under a constant predetermined pressure, and an arm secured to the lower end of the plug and extending out horizontally to carry a glare shield.

3. In a vehicle body having a windshield opening and a windshield header comprising a panel extending downwardly from the roof and offset forwardly to provide a horizontal flange, a vertical pivot secured to said flange forwardly of the plane of said panel, an arm extending horizontally and rearwardly from said pivot and adapted to swing in a horizontal arc below said flange, and a glare shield pivotally connected to the rear end of said arm to swing about substantially a horizontal axis.

4. In a vehicle body having a windshield opening and a header extending transversely above said opening, a glare shield, a mounting device for said shield comprising a vertical pivot secured to said header and lying within the margin of said opening, an arm connected to the pivot within the margin of the opening and adapted to swing in a horizontal arc below the header, and means on said arm for pivotally connecting the shield thereto.

ALBERT P. BALL.